United States Patent
Zaitsu

(10) Patent No.: US 7,352,734 B2
(45) Date of Patent: Apr. 1, 2008

(54) PUBLIC WIRELESS LAN CONNECTION SERVICING DEVICE AND METHOD

(75) Inventor: Makoto Zaitsu, Tokyo (JP)

(73) Assignee: NEC Corporation, Tokyo (JP)

( * ) Notice: Subject to any disclaimer, the term of this patent is extended or adjusted under 35 U.S.C. 154(b) by 539 days.

(21) Appl. No.: 11/081,637

(22) Filed: Mar. 17, 2005

(65) Prior Publication Data

US 2005/0207378 A1   Sep. 22, 2005

(30) Foreign Application Priority Data

Mar. 18, 2004   (JP) .............................. 2004-079109

(51) Int. Cl.
*H04Q 7/24*   (2006.01)
(52) U.S. Cl. ...................................... 370/338
(58) Field of Classification Search ................. 370/338
See application file for complete search history.

(56) References Cited

U.S. PATENT DOCUMENTS

| 2003/0092395 A1 | 5/2003 | Gassho et al. |
| 2003/0103464 A1 | 6/2003 | Wong et al. |

FOREIGN PATENT DOCUMENTS

| EP | 1 035 741 A2 | 9/2000 |
| JP | 2002-353852 A | 12/2002 |
| JP | 2003-101545 A | 4/2003 |
| JP | 2003-178144 A | 6/2003 |

*Primary Examiner*—William D. Cumming
(74) *Attorney, Agent, or Firm*—Sughrue Mion, PLLC

(57) ABSTRACT

A utilization ticket is provided with a wireless IC (Integrated circuit) interface section for performing bi-directional communication with a portable terminal and a first communication program transmission section, a ticket issuing device is connected to an authentication server via a communication network and provided with a communication program and a first utilization ticket issuing section, the portable terminal is provided with a wireless IC interface section for performing bi-directional communication with the utilization ticket, a wireless LAN (Local Area Network) interface section for performing bi-directional communication with an access point, a first terminal information transmission section, and a communication-related settings making section, and the access point is provided with a wireless LAN interface section for performing bi-directional communication with the portable terminal, an authentication requesting section, and an authentication result information transmitting section.

27 Claims, 6 Drawing Sheets

PUBLIC WIRELESS LAN CONNECTION SERVICING DEVICE AND METHOD

BACKGROUND OF THE INVENTION

1. Field of the Invention

The present invention relates to a public wireless LAN (Local Area Network) connection servicing device and method, and more particularly to the public wireless LAN connection servicing device and method that includes a utilization ticket for adding a wireless IC tag to a portable terminal to make settings of a communication relation in the portable terminal, so that the portable terminal may be connected to a public wireless LAN and a ticket issuing device for issuing the utilization ticket, to provide a user of the portable terminal with service of making the above communication-related settings.

The present application claims priority of Japanese Patent Application No. 2004-079109 filed on Mar. 18, 2004, which is hereby incorporated by reference.

2. Description of the Related Art

When a user utilizes a public wireless LAN connection (hot spot) service, conventionally settings of a wireless LAN adapter, such as a wired equivalent privacy (WEP) key or an extended services set-identity (ESS-ID), network settings of an Internet protocol (IP) address or a default gateway, and installing of various kinds of communication application programs to be used have been made to a portable terminal of the user in advance.

When making such wireless LAN adapter settings and network settings, depending on providers who provide the hot spot service, the user has to keep in mind such points as the wireless LAN adapter and contents of network settings that vary with their security policies and portable terminal configurations and operation methods in setting that vary with types of the wireless LAN adapter and the portable terminal.

Further, to utilize a special communication application, conventionally it has been necessary to install a dedicated communication program prepared by the hot spot service provider or a like.

These points may not be difficult to perform for the user familiar with an operation of network equipment, but are difficult to do so for the user not familiar with the operation of network equipment, thus leading to a problem that the user cannot utilize the hot spot service after all even if the user wants to do so. Further, for example, even the user familiar with the operation of network equipment cannot easily set the wireless LAN adapter or a network properly when the user is on the road, which is a significant drawback. Therefore, means and a method for facilitating such settings have been desired by the user not familiar with the operation of the network equipment so that the user can make settings without assistance from persons familiar with it; and means and a method for facilitating such settings have been desired by the user familiar with it so that the user can make settings when the user is on the road.

Conventionally, as these means and methods, those have been known that are described in Japanese Patent Application Laid-open Nos. 2003-101545, 2003-178144, 2002-353852, and a like.

Next, Japanese Patent Application Laid-open Nos. 2003-101545 (see pp. 1-8), and 2003-178144 (see pp. 1-28) among the above patent documents will be described in detail.

First, according to a "Method for Controlling Sign-Up of Wireless LAN Terminal for Wireless LAN, Wireless LAN Base Station device, and Wireless LAN Terminal Device" described in Japanese Patent Application Laid-open No. 2003-101545, configuration information of a plurality of wireless LANs from a wireless base station are transmitted to a wireless LAN terminal based on authentication information of a wireless tag added to the wireless LAN terminal, to connect the wireless LAN terminal to any one of the plurality of wireless LANs without jeopardizing security of resources or a like on the wireless LANs in such a manner that a user of the wireless LANs may not need to know about an LAN configuration.

Also, with configurations of a "Method for Assisting Provision of Network Connection Service" described in Japanese Patent Application Laid-open No. 2003-178144, to permit a computer to access a service providing system, an on-line sign-up program required to rewrite a setting file of the computer is provided, to facilitate provision of service related to utilization of a network, thereby permitting persons having less knowledge of the computer to access the network relatively easily.

Configurations disclosed in the Japanese Patent Application Laid-open No. 2003-101545 are based on the assumption that its invention is utilized on a restricted condition of a factory or a like and suffers from a great bottleneck that a wireless tag needs to be attached to a terminal in advance, so that it is not well suited for utilization of public wireless LAN connection service when the user is on the road, and that configuration information of a plurality of wireless LANs from a wireless base station are transmitted to a wireless LAN terminal and obtained; and so configuration information of a wireless LAN that need not be connected is also stored in a memory in the wireless LAN terminal, so that the memory cannot be utilized effectively, and also has such a disadvantage that if, for example, the wireless LAN terminal with the wireless tag is lost, the lost wireless tag may be hijacked illegally by a third party.

Configurations disclosed in the Japanese Patent Application Laid-open No. 2003-178144 are based on the assumption that an on-line sign-up program is provided only to a computer. Therefore, a small portable apparatus such as a portable telephone or a built-in apparatus is not provided with an interface having an external medium such as CD-ROM (compact disc-read only memory) or a USB (Universal Serial Bus) memory often, so that the program cannot be installed in it in some cases. Further, the installing involves much manpower, and therefore is troublesome. Further, some types and apparatus configurations have a disadvantage that they cannot be applied to different contents of settings of the wireless LAN or the network.

SUMMARY OF THE INVENTION

In view of the above, the present invention has been developed, and it is an object of the present invention to provide a public wireless LAN connection servicing device and method that, when making settings of a wireless LAN adapter or a network to a portable terminal of a user in order to connect the portable terminal to a public wireless LAN, exempts the user from making these settings in terms of the user's operation, reduces a size of a memory to be used to a minimum required value in terms of resources of the portable terminal, and provides secured service in terms of security.

According to a first aspect of the present invention, there is provided a public wireless local area network (LAN) connection servicing device for providing service of making settings of a communication relation in a portable terminal of a user, the servicing device including:

a utilization ticket including a wireless integrated circuit (IC) tag to make the settings of the communication relation in the portable terminal, so that the portable terminal may be connected to a public wireless local area network; and a ticket issuing device for issuing the utilization ticket, wherein the utilization ticket includes a wireless integrated circuit interface section for performing bi-directional communication with the portable terminal and a memory section;

wherein the wireless integrated circuit (IC) tag in the utilization ticket includes a wireless integrated circuit interface section for performing bi-directional communication with the portable terminal and a memory section;

wherein the ticket issuing device includes a communication program of the communication relation, in accordance with each type and each class of the portable terminal and a first utilization ticket issuing means for issuing the utilization ticket by storing the communication program in the memory section in the utilization ticket when the user wishes to purchase the utilization ticket; and wherein the portable terminal includes a wireless integrated circuit interface section for performing bi-directional communication with the utilization ticket, a terminal memory section for at least storing terminal information containing the type and the class of the portable terminal, and a first terminal information transmitting means for transmitting the terminal information to the utilization ticket.

In the foregoing, a preferable mode is one wherein the utilization ticket further includes a first communication program transmitting means for receiving the terminal information from the portable terminal and, based on the type and the class contained in the terminal information, obtaining the corresponding one of the communication programs from the memory section and transmitting the communication program to the portable terminal; and the portable terminal further includes a communication-related settings making means for receiving the communication program transmitted by the first communication program transmitting means, storing the communication program in the terminal memory, and initiating the communication program to make the settings of the communication relation in the portable terminal.

Also, a preferable mode is one wherein the ticket issuing device is connected via a communication network to an authentication server for generating and managing authentication information of the user; and the first utilization ticket issuing means, when the user wishes to purchase the utilization ticket, requests the authentication server to generate the authentication information, receives the generated authentication information, stores the communication program to which the authentication information is added in the memory section in the utilization ticket, and issues the utilization ticket.

Another preferable mode is one that wherein the portable terminal further includes: a wireless local area network interface section for performing bi-directional communication with an access point connected to a plurality of devices on the communication network; an access point connection means for connecting the communication program to the access point in response to notification that settings of the communication relation have been completed, from the communication-related settings making means; and an authentication information transmitting means for transmitting the authentication information added to the communication program to the access point in response to notification that the connection between the access point and the communication program has been established, from the access point connection means; and the access point further includes: a wireless local area network interface section for performing bi-directional communication with the portable terminal; an authentication requesting means for receiving the authentication information from the portable terminal, transmitting the received authentication information to the authentication server, and requesting the authentication server to generate authentication result information in response to the transmitted authentication information; and an authentication result information transmitting means for receiving the generated authentication result information from the authentication server and transmitting the received authentication result information to the portable terminal which has transmitted the authentication information.

Still another preferable mode is one wherein the terminal information of the portable terminal further includes a terminal identification code that distinguishes the portable terminal from any others of the portable terminals; the memory section in the utilization ticket further stores the terminal identification code obtained when the terminal information from the portable terminal is received for the first time by the first communication program transmitting means; and the first communication program transmitting means further includes a terminal information checking means for, when having received the terminal information from the portable terminal, checking the terminal identification code contained in the received terminal information against the terminal identification code stored in the memory section and, only when the received terminal identification code matches with the stored terminal identification code as a result of the checking by the terminal information checking means, obtaining the corresponding one of the communication programs from the memory section based on the type and the class contained in the received terminal information and transmitting the obtained communication program to the portable terminal and, if the received terminal identification code does not match with the stored terminal identification code, avoiding transmitting the obtained communication program to the portable terminal.

An additional preferable mode is one wherein the ticket issuing device includes a wireless integrated circuit interface section for performing bi-directional communication with the portable terminal, and a second utilization ticket issuing means for, when the user wishes to purchase the utilization ticket, requesting the authentication server to generate the authentication information, for receiving the generated authentication information, for storing the received authentication information in the memory section of the utilization ticket, and for issuing the utilization ticket; the portable terminal includes a wireless integrated circuit interface section for performing bi-directional communication with the ticket issuing device, an authentication information receiving means for receiving the authentication information from the utilization ticket, and a second terminal information transmitting means for transmitting the authentication information and the terminal information received by the authentication information receiving means to the ticket issuing device; and the ticket issuing device further includes a second communication program transmitting means for receiving the authentication information and the terminal information from the portable terminal and, based on the type and the class contained in the received terminal information, obtaining the corresponding one of the communication programs, adding the received authentication information to the obtained communication program, and transmitting it to the portable terminal.

Also, another preferable mode is one wherein the portable terminal is further connected via the communication network to a providing server from which the communication program is provided; the providing server is provided with the communication program of the communication relation, in accordance with each type and each class of the portable terminal; the ticket issuing device is provided with address information that contains a network address required to connect the portable terminal to the providing server and a third utilization ticket issuing means for, when the user wishes to purchase the utilization ticket, requesting the authentication server to generate the authentication information, for receiving the generated authentication information, for storing the received authentication information and the address information in the memory section of the utilization ticket, and for issuing the utilization ticket; and the portable terminal further includes an authentication address information receiving means for receiving the authentication information and the address information from the utilization ticket, an authentication terminal information transmitting means for transmitting the authentication information and the terminal information to one of the providing servers that corresponds to the network address contained in the address information received by the authentication address information receiving means, and a third communication program receiving means for receiving from the providing server the communication program to which the authentication information is added, based on the type and the class contained in the terminal information transmitted by the authentication terminal information transmitting means.

An additional preferable mode is one wherein the utilization ticket or the ticket issuing device is utilized in an area that can be connected to the public wireless local area network or commercial facilities utilized by the user.

Also, a further preferable mode is one wherein the communication network is a portable telephone network or a personal handy-phone system network.

According to a second aspect, there is provided a public wireless LAN connection servicing method for providing service of making settings of a communication relation in a portable terminal of a user, by using the portable terminal of the user including a wireless integrated circuit interface section and a terminal memory section for at least storing terminal information containing a type and a class of the portable terminal, a utilization ticket including a wireless integrated circuit tag which includes a wireless integrated circuit interface section and a memory section, so that the settings of a communication relation may be made in the portable terminal, and a ticket issuing device for issuing the utilization ticket, the method including:

a communication program storing step of storing in advance the communication-related communication program that corresponds to each type and each class of the portable terminal in the ticket issuing device;

a first utilization ticket issuing step of, when the user wishes to purchase the utilization ticket, storing the communication program in the memory section of the utilization ticket and issuing the utilization ticket;

a first terminal information transmitting step of transmitting the terminal information to the utilization ticket.

With the above configurations, a communication program in accordance with a type and a class of a portable terminal of a user is transmitted to this portable terminal from a utilization ticket capable of bi-directional communication with the portable terminal and automatically run, to make communication-related settings to the portable terminal, so that the user need not make the communication-related settings to the portable terminal for himself/herself, to save labor of installation and avoid mistakes in setting, thereby enabling providing a public wireless LAN connection servicing device and method that enables very simple and accurate connection to a public wireless LAN in terms of user operations.

Further, with the configuration, only such a communication program as to be in accordance with the type and the class of the user's portable terminal is transmitted to this portable terminal from the utilization ticket capable of bi-directional communication with portable terminal, so that it is possible to provide a public wireless LAN connection servicing device and method that can utilize a memory in the user's portable terminal effectively in terms of resources of the portable terminal.

With another configuration as described above, when a utilization ticket is used for the first time, a terminal identification code of a portable terminal used is stored in a memory section of the utilization ticket so that when the utilization ticket is used next time, the terminal identification code stored in the memory section is compared with a terminal identification code of a portable terminal used next and only if the former terminal identification code matches with the later terminal identification code as a result of the checking, a communication program may be sent to the portable terminal. It is thus possible to provide, in terms of security, a secured public wireless LAN connection servicing device and method that prevents illegal hijacking of the utilization ticket by any other than its owner even if, for example, the utilization ticket is lost or stolen.

With a further configuration as described above, a communication program for making communication-related settings to a portable terminals is obtained from a ticket issuing device and transmitted to the portable terminal, to eliminate necessity of storing the communication program in a utilization ticket in terms of its resources, so that it is possible to provide a public wireless LAN connection servicing device and method that can significantly reduce a size of a memory in a wireless IC to be added to the utilization ticket.

With a still further configuration as described above, a communication program for making communication-related settings to a portable terminal is obtained from a providing server and transmitted to the portable terminal, to eliminate necessity of storing the communication program in a utilization ticket in terms of its resources, so that it is possible to provide a public wireless LAN connection servicing device and method that can significantly reduce a size of a memory in a wireless IC to be added to the utilization ticket and also decreases occupied time required by a ticket issuing device to issue the utilization ticket as well as the number of the ticket issuing devices to be installed.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best mode of carrying out the present invention will be described in further detail using various embodiments with reference to the accompanying drawings.

An object, in terms of operations of a user, of preventing settings of a wireless LAN adapter or a network from being made to a portable terminal of the user to be connected to a public wireless LAN is realized by providing such a configuration that a communication program in accordance with a type and a class of the portable terminal may be transmitted to the portable terminal of the user from a utilization ticket capable of bi-directional communication with the portable terminal and automatically run to make communication-related settings to the portable terminal.

Another object, in terms of resources of the portable terminal of the user, of reducing a size of a memory to be used to a minimum required value is realized by providing such a configuration that only such a communication program as to be in accordance with a type and a class of the portable terminal may be transmitted to the portable terminal from a utilization ticket capable of bi-directional communication with the portable terminal.

A further object, in terms of security, of ensuring safety is realized by providing such a configuration that when a utilization ticket is used for first time, a terminal identification code of the portable terminal used is stored in a memory section of the utilization ticket so that when the utilization ticket is used next time, the terminal identification code stored in the memory section is compared with a terminal identification code of a portable terminal used next and only if the former terminal identification code matches with the later terminal identification code as a result of the checking, a communication program may be sent to the portable terminal.

First Embodiment

The following will describe the first embodiment of the present invention.

Figure 1:
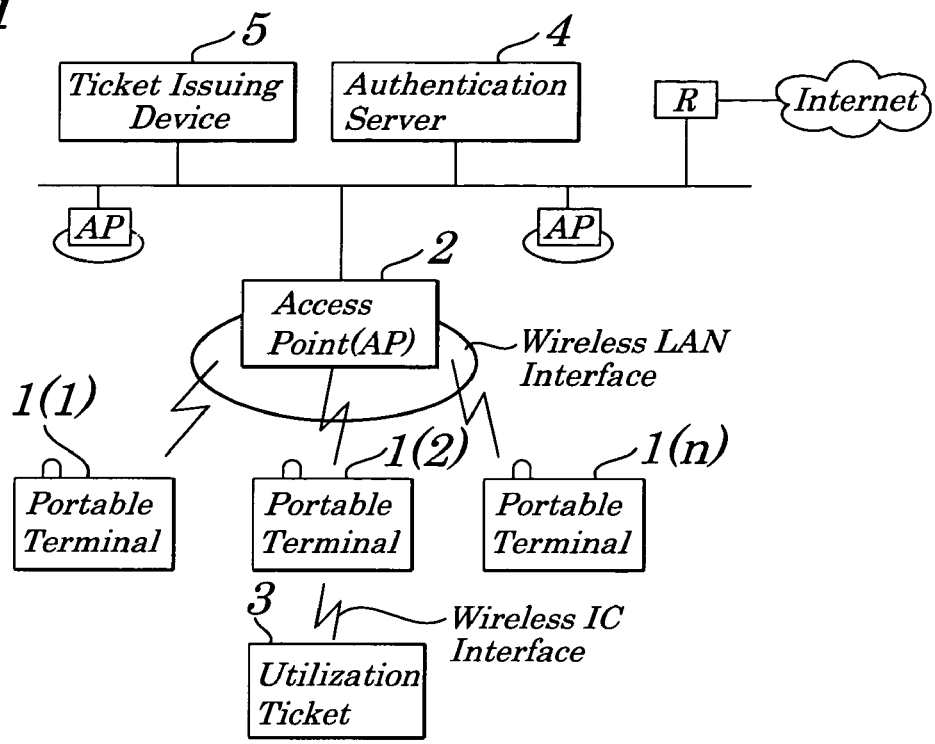
FIG. 1 is a block diagram for showing a configuration of a public wireless LAN connection servicing system according to a first embodiment of the present invention.

FIG. 1 is a block diagram for showing a configuration of a public wireless local area network (LAN) connection servicing system according to the first embodiment of the present invention. First, an overall configuration of the system is described below.

As shown in the FIG. 1, the public wireless LAN connection servicing system of the embodiment includes a portable terminal 1(1), 1(2), . . . , 1(*n*) provided with communication section by use of a wireless LAN interface and another communication section by use of a wireless integrated circuit (IC) interface, an access point 2 provided with communication section by use of the wireless LAN interface, a communication network serving as a media for connecting the plurality of access points 2, an authentication server 4, and the Internet to each other, the authentication server 4 for generating authentication information to be sent to the portable terminal 1 and authenticating the portable terminal 1, a utilization ticket 3 provided with a communication section for storing a communication program which runs in the portable terminal 1 to communicate with the portable terminal 1 by using the wireless IC interface, and a ticket issuing device 5 provided with a section for writing a communication program to the utilization ticket 3.

Next, the components of the public wireless LAN connection servicing system will be described in detail.

Figure 2:
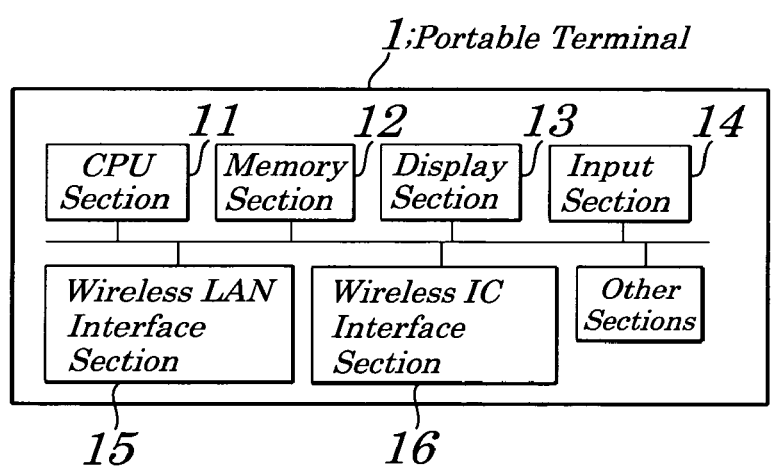
FIG. 2 is a block diagram for showing a configuration of a portable terminal being used in the first embodiment.

The portable terminal 1 is an information processing terminal such as a notebook personal computer, a personal digital assistant (PDA), or a portable telephone and, as shown in FIG. 2, provided with a central processing unit (CPU) section 11, a memory section 12, a display section 13, an input section 14, a wireless LAN interface section 15, and a wireless IC interface section 16, thus having a function of bi-directional communication via the access point 2 by use of the wireless LAN interface section 15. It is further provided with the wireless IC interface section 16 for communication with a wireless IC tag 30 integrated into the utilization ticket 3, thus having a function of transmitting data to and receiving it from the wireless IC tag 30. It further has a function to execute the communication program read from the wireless IC tag 30 via the wireless IC interface section 16.

The communication program is provided with a function to make communication-related settings of the portable terminal 1 and a function to provide a communication application via the public wireless LAN. The communication-related settings include specifically, for example, all of those related to a wireless LAN adapter such as ESS-ID (Extended Service Set-Identity) or WEP (Wired Equivalent Privacy) keys and those related to a network such as TCP/IP (Transmission Control Protocol/Internet Protocol) for IP (Internet Protocol) addresses or DNS (Domain Name Protocol) server addresses. The communication application may be of, for example, an IP voice telephone function for conversion between portable terminals, a TV (Television) telephone function, a mail function, a chat function, an attraction reserving function in an amusement park, or a like. Although the wireless IC interface section 16 in this embodiment may be of, for example, ISO (International Organization for Standardization) 14443, ISO15693, or a like, the system is not limited individually in the present invention.

The access point 2 is provided with the wireless LAN interface, establishing connection between a plurality of portable terminals, thus having a function to have mutual connection with any other access points 2 or a device such as authentication server 4 on the communication network. It also has a function to obtain authentication information from the portable terminal 1 to prevent illegal access and make an authentication request to the authentication server 4.

Figure 3:
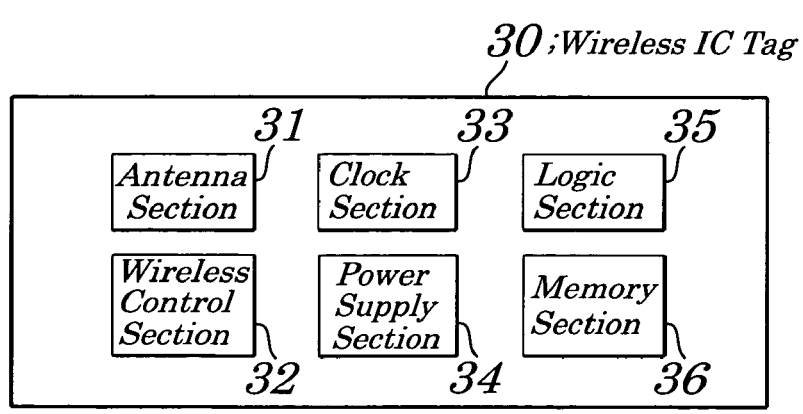
FIG. 3 is a block diagram for showing a configuration of a wireless IC tag according to the first embodiment.

The utilization ticket 3, which is issued by a provider who provides public wireless LAN connection service, can be utilized in commercial facilities available for a user, and the wireless IC tag 30 is incorporated in the utilization ticket 3. The wireless IC tag 30 is provided with a function to transmit and receive data between the portable terminal 1 and the ticket issuing device 5, and includes, for example as shown in FIG. 3, an antenna 31, a wireless control section 32, a clock section 33, a power source section 34, and a logic section 35, each making up a wireless IC interface section, and a memory section 36. The hardware configuration of the wireless IC tag 30 is not directly related to a servicing method of the present invention, but is only an example and so not specific at all.

The authentication server 4 manages information of the user and has a function to generate authentication information to be written (stored as data) in the utilization ticket 3 when the ticket issuing device 5 issues the utilization ticket 3 and a function to perform authentication of the portable terminal 1, when the authentication server 4 receives an authentication request for the portable terminal 1 of the user from the ticket issuing device 5 via the access point 2.

The ticket issuing device 5 issues the utilization ticket 3 and has a function to write authentication information obtained from the authentication server 4 and a communication program containing settings information of the portable terminal 1, or a like, into the wireless IC tag 30 of the utilization ticket 3.

Next, a processing procedure for operations of the public wireless LAN connection servicing system of this embodiment is described with reference to a flowchart of FIG. 4.

The system of this embodiment is made up a first utilization ticket issuing section 51a included in the ticket issuing device 5; a first terminal information transmitting section 18a, a communication-related settings making section 18b, an AP (access point) connection section 18c, and an authentication information transmitting section 18d included in the portable terminal 1; a first communication program transmitting section 35a included in the utilization ticket 3; and an authentication requesting section 21a, and an authentication result information transmitting section 21b included in the access point 2. According to the above procedure, processing is performed on the first utilization ticket issuing section 51a, the first terminal information transmitting section 18a, the first communication program transmitting section 35a, the communication-related settings making section 18b, the AP connection section 18c, the authentication information transmitting section 18d, the authentication requesting section 21a and the authentication result information transmitting section 21b in this order. The operations in these sections are described below along the order.

First, when the user makes a request to the ticket issuing device 5 for purchase of the utilization ticket 3 (Step A1), in the ticket issuing device 5, the first utilization ticket issuing section 51a requests the authentication server 4 to generate authentication information required to connect the portable terminal 1 to the public wireless LAN (Step A2), receives the generated authentication information from the authentication server 4 (Step A3). And then, in Step A4, the first utilization ticket issuing section 51a incorporates the received authentication information into a communication program in the ticket issuing device 5, writes this communication program into the memory section 36 of the utilization ticket 3, and issues the utilization ticket 3 (Step A5).

Next, the first terminal information transmitting section 18a of the portable terminal 1 transmits via the wireless IC interface section 16 to the utilization ticket 3, terminal information that enables identifying a type, a class, or a like of the portable terminal 1 (Step A6).

Next, the first communication program transmitting section 35a in the utilization ticket 3 receives the terminal information from the portable terminal 1 and, based on the type and the class contained in this terminal information, selects the corresponding one of the communication programs from the memory section 36 of the utilization ticket 3 and prepares for transmission of this communication program to the portable terminal 1 (Step A7).

Next, the communication-related settings making section 18b in the portable terminal 1 receives via the wireless IC interface section 15 the communication program transmitted by the first communication program transmitting section 35a, to store this communication program in the memory section 12 of the portable terminal 1 and runs this communication program (Step A8). When run, the communication program first makes communication-related settings to the portable terminal 1 through an API (Application Programming Interface) of the portable terminal 1 (Step A9) It is to be noted that the communication program has been selected in accordance with the type and the class of the portable terminal 1 at Step A7, to completely accommodate possible cases where a setting method varies with the type and the class. The communication-related settings may include, for example, settings of the wireless LAN interface or TCP/IP for the ESS-ID, WEP keys, or a like. When the setting is completed, the communication program notifies the AP connection section 18c of completion of the communication-related settings.

Next, in response to notification of the completion of the communication-related settings from the communication-related settings making section 18b, the AP connection section 18c in the portable terminal 1 connects the communication program to the access point 2 (Step A10) and, upon completion of this connection, notifies the authentication information transmitting section 18d of completion of the connection.

Next, in response of notification of the completion of the connection from the AP connection section 18c, the authentication information transmitting section 18d in the portable terminal 1 transmits the authentication information added to the communication program to the access point 2, to make a request for authentication of connection to a communication network 6 (Step A11).

Next, the authentication requesting section 21a in the access point 2 receives the authentication information from the portable terminal 1 and transmits it to the authentication server 4 to make a request for authentication (Step A12).

Next, the authentication result information transmitting section 21b in the access point 2 receives information of a result of authentication based on the authentication information transmitted from the authentication server 4 (Step A13) and transmits this authentication result information to the portable terminal 1 to which this authentication result information relates (Step A14).

Next, when having received the authentication result information from the access point 2, the portable terminal 1 performs communication through the access point 2 and the communication network 6 if the authentication result is "OK" (Step A15).

With the configuration of the first embodiment as described above, the communication program in accordance with a type and a class of the portable terminal 1 of the user is transmitted to the portable terminal 1 of the user from the utilization ticket 3 through the wireless IC interface capable of bi-directional communication with the portable terminal 1 and automatically run, to make communication-related settings to the portable terminal 1, so that the user need not make the communication-related settings to the portable terminal 1 for himself, to save labor of installation and avoid mistakes in setting, thereby enabling providing a public wireless LAN connection servicing system that enables very simple and accurate connection to the public wireless LAN in terms of user operations.

Further, in this configuration, only such a communication program as to be in accordance with the type and the class of the user's portable terminal 1 is transmitted to the portable terminal 1 from the utilization ticket 3 through the wireless IC interface capable of bi-directional communication with the portable terminal 1, so that it is possible to provide the public wireless LAN connection servicing system that can utilize the memory mounted in the portable terminal 1 effectively in terms of the resources of the portable terminal 1 of the user.

Second Embodiment

The following will describe the second embodiment of the present invention.

Figure 4:
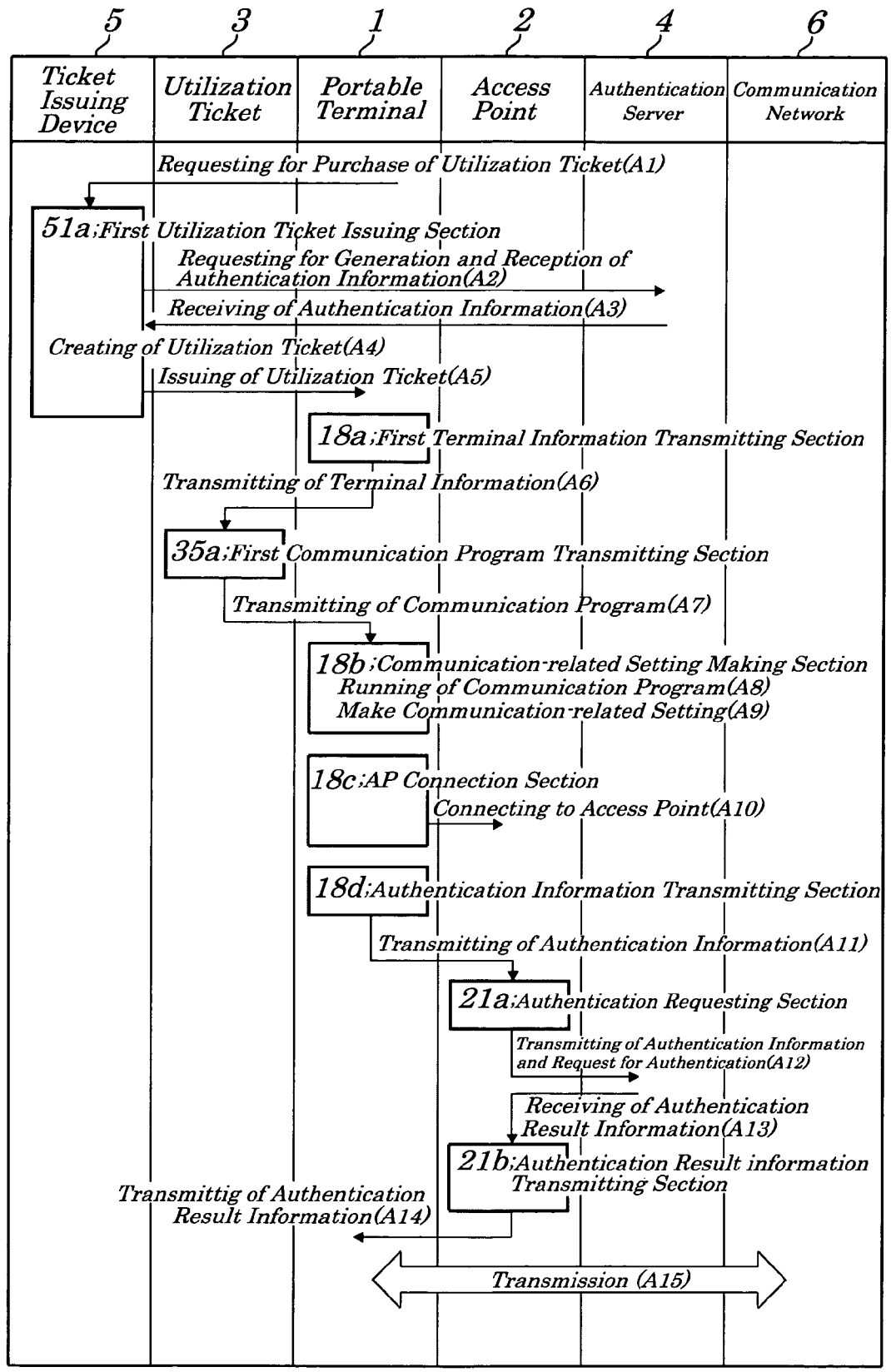
FIG. 4 is a flowchart for showing a processing procedure for operations of the public wireless LAN connection servicing system according to the first embodiment.
Figure 5:
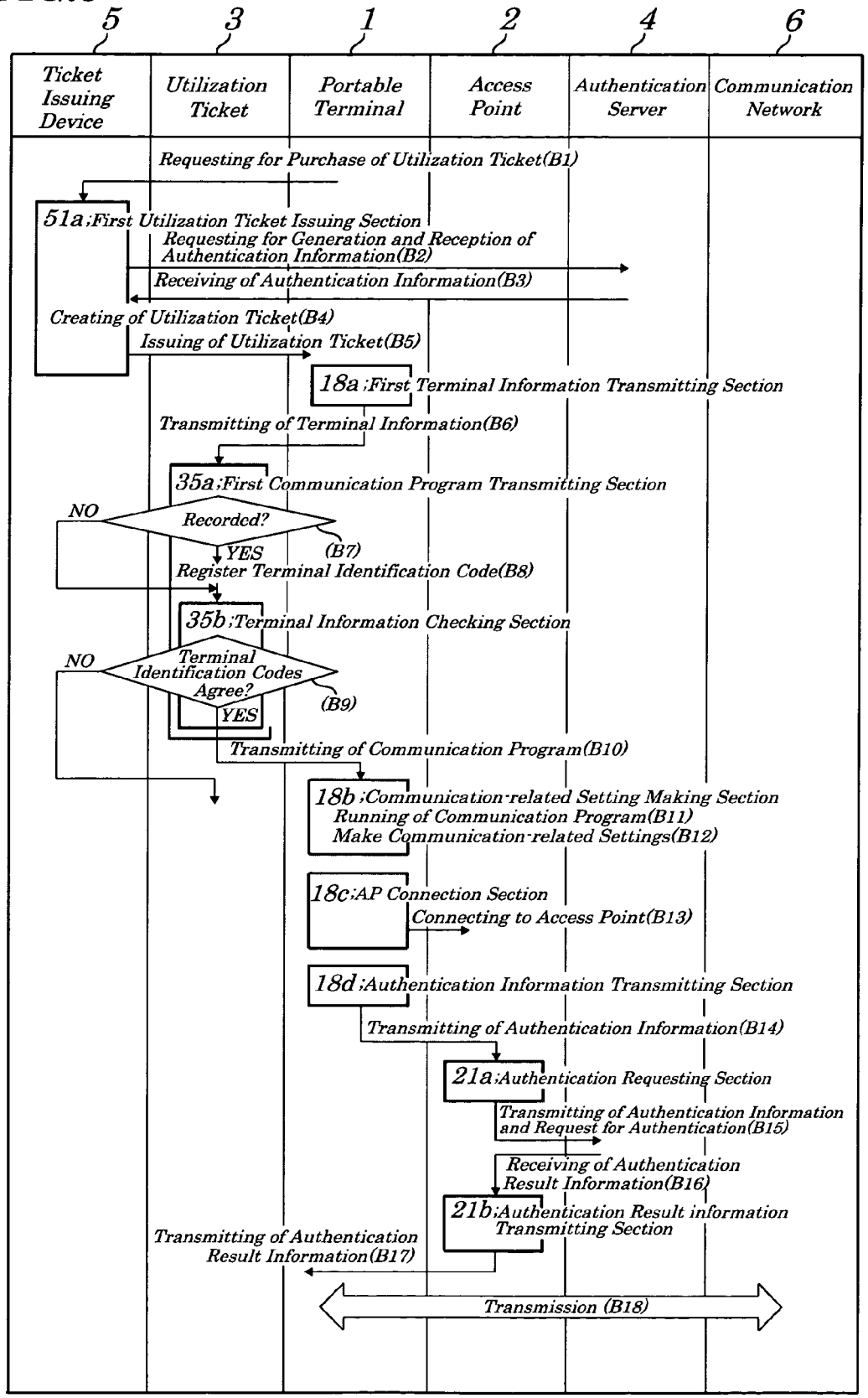
FIG. 5 is a flowchart for showing a processing procedure for operations of a public wireless LAN connection servicing system according to a second embodiment of the present invention.

FIG. 5 is a flowchart for showing a processing procedure for operations of a public wireless LAN connection servicing system according to the second embodiment of the present invention, a configuration of which is significantly different from that of the above-described first embodiment (FIG. 4) in that in this second embodiment, once a portable terminal 1 has read a communication program, the communication program cannot be read any more. A procedure for the processing different from that of the first embodiment of FIG. 4 is described below with reference to FIG. 5.

The system of this second embodiment has such a configuration that a terminal information checking section 35b is included in a first communication program transmitting section 35a provided to a utilization ticket 3, so that a procedure for processing to transmission of terminal information from the portable terminal 1 to the utilization ticket 3 (Steps B1 to B6) is the same as that (Steps A1 to A6) of the first embodiment.

The terminal information about the portable terminal 1 contains a terminal identification code that distinguishes the portable terminal 1 from any other portable terminals, so that when having received the terminal information from the portable terminal 1, the first communication program transmitting section 35a decides whether the terminal information has been received for the first time (Step B7) and, if such is the case, stores this obtained terminal identification code in a memory section 36 of the utilization ticket 3 (Step B8).

Next, when having received a terminal information from the portable terminal 1, the terminal information checking section 35b included in the first communication program transmitting section 35a of the utilization ticket 3 compares and checks a terminal identification code contained in this terminal information with the terminal identification code in the memory section of the utilization ticket 3 (Step B9). Only if the former terminal identification code matches with the later terminal identification code, as a result of the checking by the terminal information checking section 35b, the first communication program transmitting section 35a acquires the corresponding one of the communication programs from the memory section 36 of the utilization ticket 3 based on a type and a class indicated by the received terminal information and prepares for transmission of this communication program to the portable terminal 1 (Step B10) and, if the former terminal identification code does not match with the later terminal identification code, avoids transmission of the communication program to the portable terminal 1. That is, the first communication program transmitting section 35a will not transmit the communication program, even if the first communication program transmitting section 35a receives a request from the portable terminal 1 for reading of the communication program. The terminal information in such a case is supposed to contain information that enables identifying not only a type and a class but also a terminal itself. For example, the terminal identification code may be an MAC (Media Access Control) address of the wireless LAN interface section of the portable terminal 1.

The subsequent processing procedure (Steps B11 to B18) is the same as that (Steps A8 to A15) of the first embodiment.

With the configuration of the second embodiment as described above, when the utilization ticket 3 is used for the first time, a terminal identification code of the portable terminal 1 used is stored in the memory section of the utilization ticket 3 so that when the utilization ticket 3 is used next time, the terminal identification code stored in the memory section is compared and checked with a terminal identification code of a portable terminal 1 used next time and only if the former terminal identification code matches with the later terminal identification code, as a result of the checking, the communication program may be sent to the portable terminal 1. It is thus possible to provide, in terms of security, a secured public wireless LAN connection servicing system that prevents illegal hijacking of the utilization ticket 3 by any other than its owner even if, for example, the utilization ticket 3 is lost or stolen.

Third Embodiment

The following will describe the third embodiment of the present invention.

Figure 6:
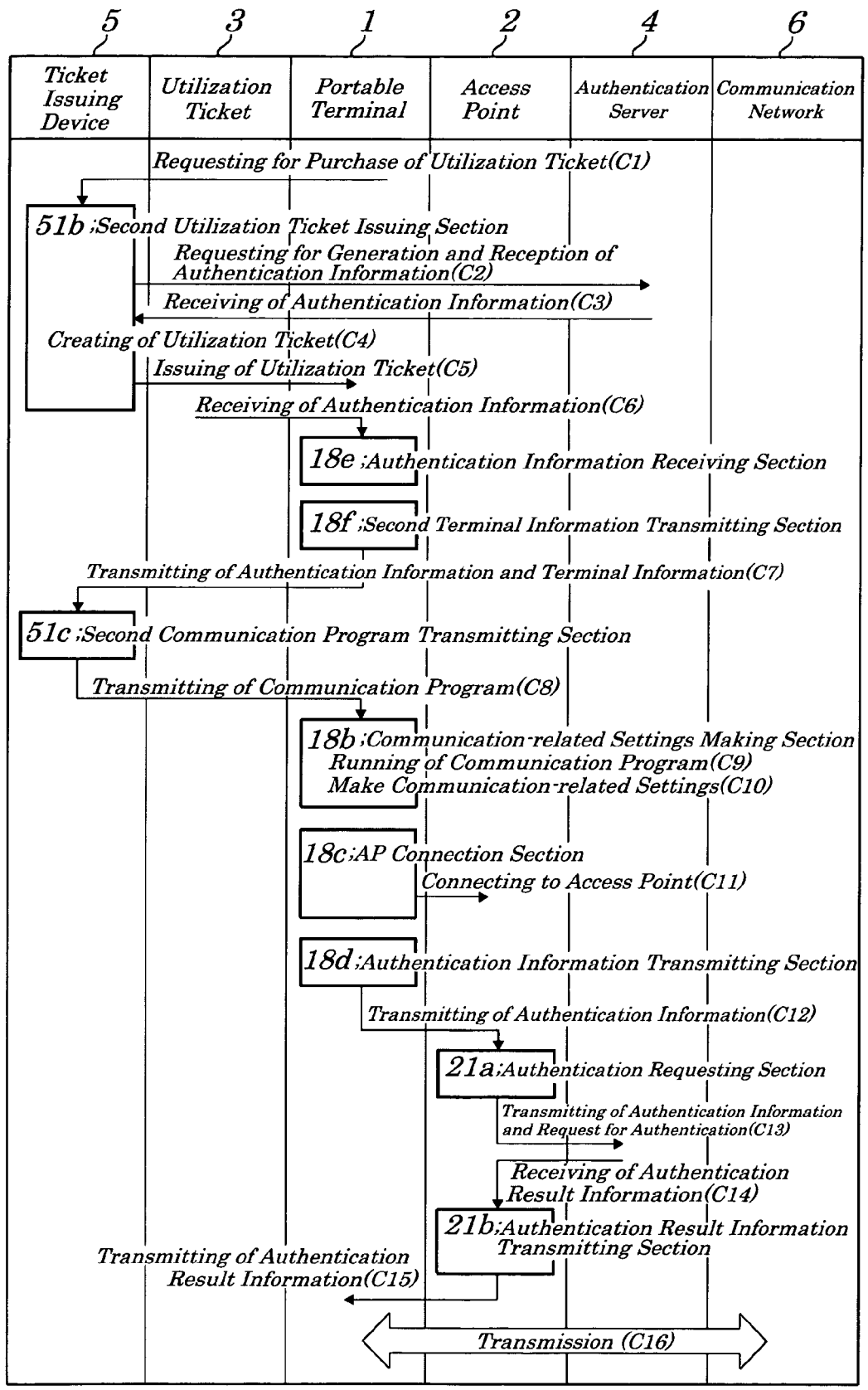
FIG. 6 is a flowchart for showing a processing procedure for operations of a public wireless LAN connection servicing system according to a third embodiment of the present invention.

FIG. 6 is a flowchart for showing a processing procedure for operations of a public wireless LAN connection servicing system according to the third embodiment of the present invention, a configuration of which is significantly different from that of the above-described first embodiment (FIG. 4) in that a ticket issuing device 5 is provided with a wireless IC interface function and a portable terminal 1 is arranged to read a communication program from the ticket issuing device 5. A procedure for the processing different from that of the first embodiment of FIG. 4 is described below with reference to FIG. 6.

The system of the third embodiment has such a configuration that the ticket issuing device 5 includes a wireless IC interface section for performing bi-directional communication with the portable terminal 1, a second utilization ticket issuing section 51b that substitutes for a first utilization ticket issuing section 51a, and a second communication program transmitting section 51c that substitutes for a first communication program transmitting section 35a and the portable terminal 1 includes a wireless IC interface section for performing bi-directional communication with the ticket issuing device 5, an authentication information receiving section 18e, and a second terminal information transmitting section 18f that substitutes for a first terminal information transmitting section 18a, so that a procedure for processing to obtaining of authentication information from an authentication server 4 by the ticket issuing device 5 (Steps C1 to C3) is the same as that (Steps A1 to A3) of the first embodiment.

When a user wishes to purchase a utilization ticket 3, the second utilization ticket issuing section 51b in the ticket issuing device 5 requests the authentication server 4 to generate authentication information (Step C2), receives the generated authentication information (Step C3). And then, in Step 4, the second utilization ticket issuing section 51b stores the authentication information in a memory section 36 of the utilization ticket 3, and after this, issues the utilization ticket 3 (Step C5).

Next, the authentication information receiving section 18*e* in the portable terminal 1 receives the authentication information from the utilization ticket 3 (Step C6).

Next, the second terminal information transmitting section 18*f* in the portable terminal 1 transmits the authentication information received by the authentication information receiving section 18*e* and terminal information to the ticket issuing device 5, to request for provision of a communication program (Step C7).

Next, the second communication program transmitting section 51*c* in the ticket issuing device 5 receives the authentication information and the terminal information from the portable terminal 1 and, based on a type and a class contained in this terminal information, obtains the corresponding one of the communication programs, adds the received authentication information to this communication program, and prepares for transmitting it to the portable terminal 1 (Step C8).

Next, communication-related settings making section 18*b* in the portable terminal 1 receives, via the wireless IC interface section 15, the communication program transmitted by the second communication program transmitting section 51*c* (Step C9).

The subsequent processing procedure (Steps C10 to C16) is the same as that (Steps A9 to A15) of the first embodiment.

In such a manner, according to the configuration of this third embodiment, a communication program required to make communication-related settings to the portable terminal 1 is not obtained from the utilization ticket 3 but obtained from the ticket issuing device 5 and transmitted to the portable terminal 1, to eliminate necessity of storing the communication program in the utilization ticket 3 in terms of its resource, so that it is possible to provide a public wireless LAN connection servicing system that can significantly reduce a size of a memory in a wireless IC to be added to the utilization ticket 3 and reduce costs of the wireless IC tag 30.

Fourth Embodiment

The following will describe the fourth embodiment of the present invention.

Figure 7:
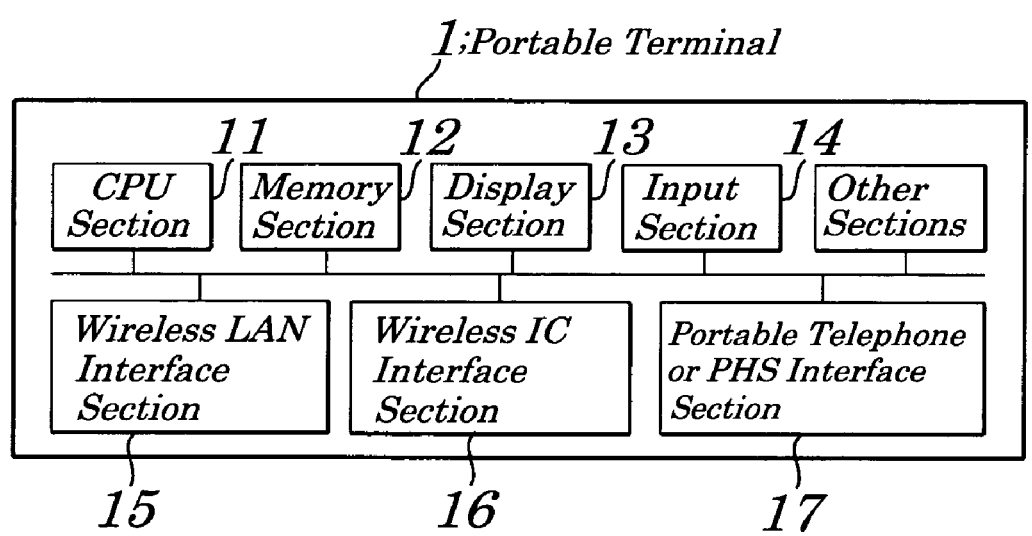
FIG. 7 is a block diagram for showing a configuration of a portable terminal being used in the third embodiment.
Figure 8:
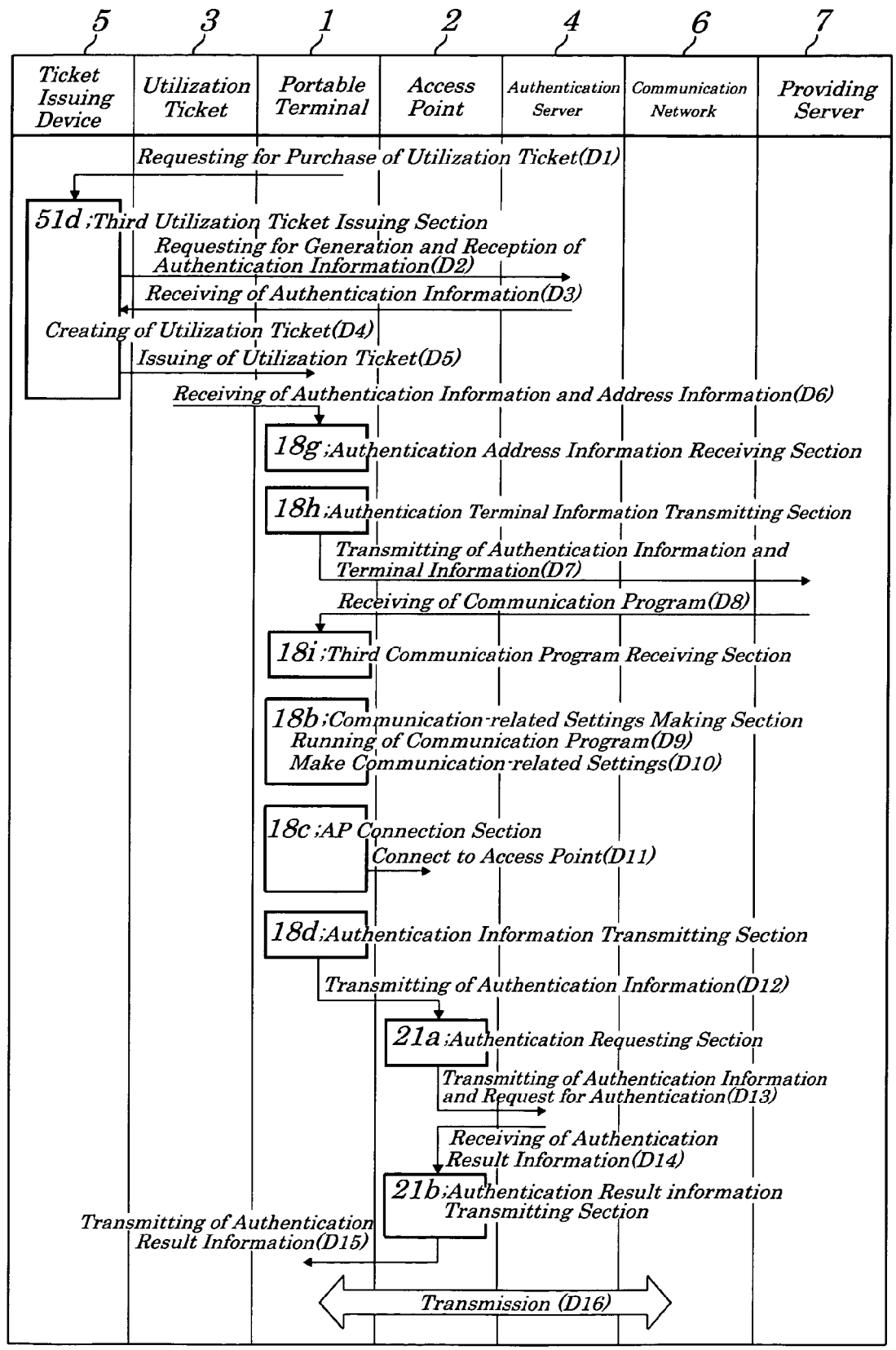
FIG. 8 is a flowchart for showing a processing procedure for operations of a public wireless LAN connection servicing system according to a fourth embodiment of the present invention.

FIG. 8 is a flowchart for showing a processing procedure for operations of a public wireless LAN connection servicing system according to the fourth embodiment of the present invention, a configuration of which is significantly different from that of the above-described first embodiment (FIG. 4) in that a portable terminal 1 is provided with third communication section such as a portable telephone or PHS (Personal Handy-phone System) so that the portable terminal 1 may download a communication program from the third communication section. That is, as shown in FIG. 7, the portable terminal 1 obtains from a utilization ticket 3 via a wireless IC interface a network address (URL: Universal Resource Identifier, or a like) where a communication program is stored.

The portable terminal 1 accesses that address via the third communication section, that is, a portable telephone network or a PHS network, to obtain the communication program and execute it.

A procedure for the processing different from that of the first embodiment of FIG. 4 is described below with reference to FIG. 8.

The system of this fourth embodiment has such a configuration that the portable terminal 1 is connected via the portable telephone network or the PHS network to a providing server 7 from which the communication program is provided, the providing server 7 is provided with a communication-related communication program in accordance with each type and each class of the portable terminal 1 in place of a ticket issuing device 5, the ticket issuing device 5 is provided with address information that contains a network address required to connect the portable terminal 1 to the providing server 7 and a third utilization ticket issuing section 51*d* that substitutes for a first utilization ticket issuing section 51*a*, and the portable terminal 1 includes an authentication address information receiving section 18*g* that substitutes for a first terminal information transmitting section 18*a*, an authentication terminal information transmitting section 18*h*, and a third communication program receiving section 18*i* that substitutes for a first communication program transmitting section 35*a*, so that a procedure for processing to obtaining of authentication information from an authentication server 4 by the ticket issuing device 5 (Steps D1 to D3) is the same as that of the first embodiment.

When the user wishes to purchase the utilization ticket 3, the third utilization ticket issuing section 51*d* in the ticket issuing device 5 requests the authentication server 4 to generate authentication information (step D2), receives the generated authentication information (step D3). And then, in step D4, the third utilization ticket issuing section 51*d* stores the authentication information and address information in a memory section of the utilization ticket 3, and after this, issues the utilization ticket 3 (Step D5).

Next, the authentication address information receiving section 18*g* in the portable terminal 1 receives the authentication information and the address information from the utilization ticket 3 through the wireless IC interface (Step D6).

Next, the authentication terminal information transmitting section 18*h* in the portable terminal 1 accesses a destination indicated by a network address contained in the address information received by the authentication address information receiving section 18*g* through the third communication section, that is, the portable telephone network or the PHS network and transmits the authentication information and the terminal information to the providing server 7 (Step D7).

Next, the third communication program receiving section 18*i* in the portable terminal 1 receives from the providing server 7 the communication program to which the authentication information is added, based on a type and a class contained in the terminal information transmitted by the authentication terminal information transmitting section 18*h* (Step D8).

The subsequent processing procedure (Steps D9 to D16) is the same as that (Steps A8 to A15) of the first embodiment.

With the configuration of the fourth embodiment as described above, a communication program for making communication-related settings to the portable terminal 1 is obtained from the providing server 7 in place of the utilization ticket 3 and transmitted to the portable terminal 1, to eliminate necessity of storing the communication program in the utilization ticket 3 in terms of its resources, so that it is possible to provide a public wireless LAN connection servicing system that can significantly reduce a size of the memory in the wireless IC to be added to the utilization ticket 3 and also decreases occupied time required by the ticket issuing device 5 to issue the utilization ticket 3 as well as the number of the ticket issuing devices 5 to be installed, thereby benefiting the service provider as well as the user because he must wait less to utilize the ticket issuing device 5.

Although the embodiments of the present invention have been described in detail with reference to the drawings, the specific configuration is not limited to them and changes, if any, in design or a like that do not depart from a gist of the present invention are included in the present invention.

For example, although the above first and second embodiments have employed such a configuration that the ticket issuing device 5 is provided with the first utilization ticket issuing section 51*a*, the portable terminal 1 is provided with the first terminal information transmitting section 18*a*, and the utilization ticket 3 is provided with the first communication program transmitting section 35*a* and the third embodiment has employed such a configuration that the ticket issuing device 5 is provided with the second utilization ticket issuing section 51*b* that substitutes for the first utilization ticket issuing section 51*a* and the second communication program transmitting section 51*c* that substitutes for the first communication program transmitting section 35*a* and the portable terminal 1 is provided with the authentication information receiving section 18*e* and the second terminal information transmitting section 18*f* that substitutes for the first terminal information transmitting section 18*a*, and the fourth embodiment has employed such a configuration that the ticket issuing device 5 is provided with the third utilization ticket issuing section 51*d* that substitutes for the first utilization ticket issuing section 51*a* and the portable terminal 1 is provided with the authentication address information receiving section 18*g* that substitutes for the first terminal information transmitting section 18*a*, the authentication terminal information transmitting section 18*h*, and the third communication program receiving section 18*i* that substitutes for the first communication program transmitting section 35*a*, such a configuration may be employed that the section indicated by the first through fourth embodiments are all provided so that the user of the portable terminal 1 can select any such of all the means included in this configuration as to be indicated by any one of these embodiments.

In the above first embodiment, when the user makes a request to the ticket issuing device 5 so that he can purchase the utilization ticket 3, he may purchase the utilization ticket 3 either by directly operating the ticket issuing device 5 for himself or by permitting an operator on the side of the service provider to operate it.

Although the above second embodiment has exemplified an MAC address included in the wireless LAN interface section in the portable terminal 1 as the terminal identification code that distinguishes the portable terminal 1 from any other portable terminals, any unique identification code or a like may be employed as far as it can distinguish the portable terminal 1 from any other portable terminals.

Since a communication program is configured to be built in the portable terminal 1 automatically, the present invention can be applied not only to a communication program (for example, Web browser, Internet mail, or a like) for a standard communication application that is installed into a typical portable terminal 1 from the beginning, but also to a case where a provider of public wireless LAN connection service provides its own communication application service. It may include, for example, attraction reserving service in an amusement park or a like.

What is claimed is:

1. A public wireless local area network connection servicing device for providing service of making settings of a communication relation in a portable terminal of a user, the servicing device comprising:
   a utilization ticket comprising a wireless integrated circuit (IC) tag to make the settings of the communication relation in the portable terminal, so that said portable terminal may be connected to a public wireless local area network; and
   a ticket issuing device for issuing said utilization ticket, wherein said utilization ticket comprises a wireless integrated circuit interface section for performing bi-directional communication with said portable terminal and a memory section;
   wherein said wireless integrated circuit (IC) tag in said utilization ticket comprises a wireless integrated circuit interface section for performing bi-directional communication with said portable terminal and a memory section;
   wherein said ticket issuing device comprises a communication program of the communication relation, in accordance with each type and each class of said portable terminal and a first utilization ticket issuing means for issuing said utilization ticket by storing the communication program in said memory section in said utilization ticket when said user wishes to purchase said utilization ticket; and
   wherein said portable terminal comprises a wireless integrated circuit interface section for performing bi-directional communication with said utilization ticket, a terminal memory section for at least storing terminal information containing the type and the class of said portable terminal, and a first terminal information transmitting means for transmitting the terminal information to said utilization ticket.

2. The public wireless local area network connection servicing device according to claim 1,
   wherein said utilization ticket further comprises a first communication program transmitting means for receiving the terminal information from said portable terminal and, based on the type and the class contained in the terminal information, obtaining the corresponding one of the communication programs from said memory section and transmitting the communication program to said portable terminal; and
   wherein said portable terminal further comprises a communication-related settings making means for receiving the communication program transmitted by said first communication program transmitting means, storing the communication program in said terminal memory, and initiating the communication program to make the settings of the communication relation in said portable terminal.

3. The public wireless local area network connection servicing device according to claim 1,
   wherein said ticket issuing device is connected via a communication network to an authentication server for generating and managing authentication information of said user; and
   wherein said first utilization ticket issuing means, when said user wishes to purchase said utilization ticket, requests said authentication server to generate the authentication information, receives the generated authentication information, stores the communication program to which the authentication information is added in said memory section in said utilization ticket, and issues said utilization ticket.

4. The public wireless local area network connection servicing device according to claim 3,
wherein said portable terminal further comprises:
a wireless local area network interface section for performing bi-directional communication with an access point connected to a plurality of devices on the communication network;
an access point connection means for connecting the communication program to said access point in response to notification that settings of the communication relation have been completed, from said communication-related settings making means; and
an authentication information transmitting means for transmitting the authentication information added to the communication program to said access point in response to notification that the connection between said access point and the communication program has been established, from said access point connection means; and
wherein said access point further comprises:
a wireless local area network interface section for performing bi-directional communication with said portable terminal;
an authentication requesting means for receiving the authentication information from said portable terminal, transmitting the received authentication information to said authentication server, and requesting said authentication server to generate authentication result information in response to the transmitted authentication information; and
an authentication result information transmitting means for receiving the generated authentication result information from said authentication server and transmitting the received authentication result information to said portable terminal which has transmitted the authentication information.

5. The public wireless local area network connection servicing device according to claim 2,
wherein the terminal information of said portable terminal further includes a terminal identification code that distinguishes said portable terminal from any others of said portable terminals;
wherein said memory section in said utilization ticket further stores the terminal identification code obtained when the terminal information from said portable terminal is received for the first time by said first communication program transmitting means; and
wherein said first communication program transmitting means further comprises a terminal information checking means for, when having received the terminal information from said portable terminal, checking the terminal identification code contained in the received terminal information against the terminal identification code stored in said memory section and, only when the received terminal identification code matches with the stored terminal identification code as a result of the checking by said terminal information checking means, obtaining the corresponding one of the communication programs from said memory section based on the type and the class contained in the received terminal information and transmitting the obtained communication program to said portable terminal and, if the received terminal identification code does not match with the stored terminal identification code, avoiding transmitting the obtained communication program to said portable terminal.

6. The public wireless local area network connection servicing device according to claim 3,
wherein said ticket issuing device comprises a wireless integrated circuit interface section for performing bi-directional communication with said portable terminal, and a second utilization ticket issuing means for, when said user wishes to purchase said utilization ticket, requesting said authentication server to generate the authentication information, for receiving the generated authentication information, for storing the received authentication information in said memory section of said utilization ticket, and for issuing said utilization ticket;
wherein said portable terminal comprises a wireless integrated circuit interface section for performing bi-directional communication with said ticket issuing device, an authentication information receiving means for receiving the authentication information from said utilization ticket, and a second terminal information transmitting means for transmitting the authentication information and the terminal information received by said authentication information receiving means to said ticket issuing device; and
wherein said ticket issuing device further comprises a second communication program transmitting means for receiving the authentication information and the terminal information from said portable terminal and, based on the type and the class contained in the received terminal information, obtaining the corresponding one of the communication programs, adding the received authentication information to the obtained communication program, and transmitting it to said portable terminal.

7. The public wireless local area network connection servicing device according to claim 3,
wherein said portable terminal is further connected via the communication network to a providing server from which the communication program is provided;
wherein said providing server is provided with the communication program of the communication relation, in accordance with each type and each class of said portable terminal;
wherein said ticket issuing device is provided with address information that contains a network address required to connect said portable terminal to said providing server and a third utilization ticket issuing means for, when said user wishes to purchase said utilization ticket, requesting said authentication server to generate the authentication information, for receiving the generated authentication information, for storing the received authentication information and the address information in said memory section of said utilization ticket, and for issuing said utilization ticket; and
wherein said portable terminal further comprises an authentication address information receiving means for receiving the authentication information and the address information from said utilization ticket, an authentication terminal information transmitting means for transmitting the authentication information and the terminal information to one of said providing servers that corresponds to the network address contained in the address information received by said authentication address information receiving means, and a third communication program receiving means for receiving from said providing server the communication program to which the authentication information is added, based on the type and the class contained in the terminal information transmitted by said authentication terminal information transmitting means.

8. The public wireless local area network connection servicing device according to claim 1, wherein said utilization ticket or said ticket issuing device is utilized in an area that can be connected to the public wireless local area network or commercial facilities utilized by said user.

9. The public wireless local area network connection servicing device according to claim 3, wherein the communication network is a portable telephone network or a personal handy-phone system network.

10. A public wireless local area network connection servicing method for providing service of making settings of a communication relation in a portable terminal of a user, by using the portable terminal of said user including a wireless integrated circuit interface section and a terminal memory section for at least storing terminal information containing a type and a class of said portable terminal, a utilization ticket comprising a wireless integrated circuit tag which comprises a wireless integrated circuit interface section and a memory section, so that the settings of a communication relation may be made in said portable terminal, and a ticket issuing device for issuing said utilization ticket, the method comprising:
 a communication program storing step of storing in advance the communication-related communication program that corresponds to each type and each class of said portable terminal in said ticket issuing device;
 a first utilization ticket issuing step of, when said user wishes to purchase said utilization ticket, storing the communication program in said memory section of said utilization ticket and issuing said utilization ticket;
 a first terminal information transmitting step of transmitting the terminal information to said utilization ticket.

11. The public wireless local area network connection servicing method according to claim 10, further comprising:
 a first communication program transmitting step wherein said utilization ticket receives the terminal information from said portable terminal and, based on the type and the class contained in the terminal information, obtains the corresponding one of the communication programs from said memory section and transmits the obtained communication program to said portable terminal; and
 a communication-related settings making step wherein said portable terminal receives the communication program transmitted by said first communication program transmitting step, stores the received communication program in said terminal memory, and runs the stored communication program to make the settings of the communication relation in said portable terminal.

12. The public wireless local area network connection servicing method according to claim 10,
 wherein said ticket issuing device is connected via a communication network to an authentication server for generating and managing authentication information of said user; and
 wherein said first utilization ticket issuing step comprises a step of, when said user wishes to purchase said utilization ticket, requesting said authentication server to generate the authentication information, of receiving the generated authentication information, of storing the communication program to which the authentication information is added in said memory section in said utilization ticket, and of issuing said utilization ticket.

13. The public wireless local area network connection servicing method according to claim 12,
 wherein said portable terminal further comprises a wireless local area network interface section for performing bi-directional communication with an access point connected to a plurality of devices on the communication network; and
 wherein said access point comprises a wireless local area network interface section for performing bi-directional communication with said portable terminal;
 the method further comprising:
 an access point connection step wherein said portable terminal connects the communication program to said access point in response to notification that the settings of the communication relation have been completed, from said communication-related settings making step;
 an authentication information transmitting step wherein said portable terminal transmits the authentication information added to the communication program to said access point in response to notification that the connection between said access point and the communication program has been established, from said access point connection step;
 an authentication requesting step wherein said access point receives the authentication information from said portable terminal and transmits the received authentication information to said authentication server, and requests said authentication server to generate authentication result information in response to the transmitted authentication information; and
 an authentication result information transmitting step wherein said access point receives the generated authentication result information from said authentication server and transmits the received authentication result information to said portable terminal which has transmitted the authentication information.

14. The public wireless local area network connection servicing method according to claim 11,
 wherein the terminal information about said portable terminal further contains a terminal identification code that distinguishes said portable terminal from any others of said portable terminals;
 wherein said memory section in said utilization ticket further stores the terminal identification code obtained when the terminal information from said portable terminal is received for the first time by said first communication program transmitting step; and
 wherein said first communication program transmitting step comprises a terminal information checking step of, when having received the terminal information from said portable terminal, checking the terminal identification code contained in the received terminal information against the terminal identification code in said memory section and, only when the received terminal identification code matches with the stored terminal identification code as a result of the checking by the terminal information checking step, obtaining the corresponding one of the communication programs from said memory section based on the type and the class contained in the received terminal information and transmitting the obtained communication program to said portable terminal and, if the received terminal identification code does not match with the stored terminal identification code, avoiding transmitting the obtained communication program to said portable terminal.

15. The public wireless local area network connection servicing method according to claim 12,
wherein said ticket issuing device comprises a wireless integrated circuit interface section for performing bi-directional communication with said portable terminal; and said portable terminal comprises a wireless integrated circuit interface section for performing bi-directional communication with said ticket issuing device; the method comprising:
a second utilization ticket issuing step of, when said user wishes to purchase said utilization ticket, requesting said authentication server to generate the authentication information, receiving the generated authentication information, storing the received authentication information in said memory section in said utilization ticket, and issuing said utilization ticket;
an authentication information receiving step of receiving the authentication information from said utilization ticket;
a second terminal information transmitting step of transmitting the authentication information and the terminal information received by said authentication information receiving step to said ticket issuing device; and
a second communication program transmitting step of receiving the authentication information and the terminal information from said portable terminal and, based on the type and the class contained in the received terminal information, obtaining the corresponding one of the communication programs, adding the received authentication information to the obtained communication program, and then transmitting the communication program with the added authentication information to said portable terminal.

16. The public wireless local area network connection servicing method according to of claim 12,
wherein said portable terminal is further connected via the communication network to a providing server from which the communication program is provided;
wherein said providing server is provided with the communication-related communication program in accordance with each type and each class of said portable terminal; and
wherein said ticket issuing device further contains address information that contains a network address required to connect said portable terminal to said providing server; the method comprising:
a third utilization ticket issuing step of, when said user wishes to purchase said utilization ticket, requesting said authentication server to generate the authentication information, receiving the generated authentication information, storing the received authentication information and the address information in said memory section in said utilization ticket, and issuing said utilization ticket;
an authentication address information receiving step of receiving the authentication information and the address information from said utilization ticket;
an authentication terminal information transmitting step of transmitting the authentication information and the terminal information to one of said providing servers that corresponds to the network address contained in the address information received by said authentication address information receiving step; and
a third communication program receiving step of receiving from said providing server the communication program to which the authentication information is added, based on the type and the class contained in the terminal information transmitted by said authentication terminal information transmitting step.

17. The public wireless local area network connection servicing method according to claim 10, wherein said utilization ticket or said ticket issuing device is utilized in an area that can be connected to the public wireless local area network or commercial facilities utilized by said user.

18. The public wireless local area network connection servicing method according to claim 12, wherein the communication network is a portable telephone network or a personal handy-phone system network.

19. A public wireless local area network connection servicing device for providing service of making settings of a communication relation in a portable terminal of a user, the servicing device comprising:
a utilization ticket comprising a wireless integrated circuit (IC) tag to make the settings of the communication relation in the portable terminal, so that said portable terminal may be connected to a public wireless local area network; and
a ticket issuing device for issuing said utilization ticket, wherein said utilization ticket comprises a wireless integrated circuit interface section for performing bi-directional communication with said portable terminal and a memory section;
wherein said wireless integrated circuit (IC) tag in said utilization ticket comprises a wireless integrated circuit interface section for performing bi-directional communication with said portable terminal and a memory section;
wherein said ticket issuing device comprises a communication program of the communication relation, in accordance with each type and each class of said portable terminal and a first utilization ticket issuing section for issuing said utilization ticket by storing the communication program in said memory section in said utilization ticket when said user wishes to purchase said utilization ticket; and
wherein said portable terminal comprises a wireless integrated circuit interface section for performing bi-directional communication with said utilization ticket, a terminal memory section for at least storing terminal information containing the type and the class of said portable terminal, and a first terminal information transmitting section for transmitting the terminal information to said utilization ticket.

20. The public wireless local area network connection servicing device according to claim 19,
wherein said utilization ticket further comprises a first communication program transmitting section for receiving the terminal information from said portable terminal and, based on the type and the class contained in the terminal information, obtaining the corresponding one of the communication programs from said memory section and transmitting the communication program to said portable terminal; and
wherein said portable terminal further comprises a communication-related settings making section for receiving the communication program transmitted by said first communication program transmitting section, storing the communication program in said terminal memory, and initiating the communication program to make the settings of the communication relation in said portable terminal.

21. The public wireless local area network connection servicing device according to claim 19,
wherein said ticket issuing device is connected via a communication network to an authentication server for generating and managing authentication information of said user; and
wherein said first utilization ticket issuing section, when said user wishes to purchase said utilization ticket, requests said authentication server to generate the authentication information, receives the generated authentication information, stores the communication program to which the authentication information is added in said memory section in said utilization ticket, and issues said utilization ticket.

22. The public wireless local area network connection servicing device according to claim 21,
wherein said portable terminal further comprises:
a wireless local area network interface section for performing bi-directional communication with an access point connected to a plurality of devices on the communication network;
an access point connection section for connecting the communication program to said access point in response to notification that settings of the communication relation have been completed, from said communication-related settings making section; and
an authentication information transmitting section for transmitting the authentication information added to the communication program to said access point in response to notification that the connection between said access point and the communication program has been established, from said access point connection section; and
wherein said access point further comprises:
a wireless local area network interface section for performing bi-directional communication with said portable terminal;
an authentication requesting section for receiving the authentication information from said portable terminal, transmitting the received authentication information to said authentication server, and requesting said authentication server to generate authentication result information in response to the transmitted authentication information; and
an authentication result information transmitting section for receiving the generated authentication result information from said authentication server and transmitting the received authentication result information to said portable terminal which has transmitted the authentication information.

23. The public wireless local area network connection servicing device according to claim 20,
wherein the terminal information of said portable terminal further includes a terminal identification code that distinguishes said portable terminal from any others of said portable terminals;
wherein said memory section in said utilization ticket further stores the terminal identification code obtained when the terminal information from said portable terminal is received for the first time by said first communication program transmitting section; and
wherein said first communication program transmitting section further comprises a terminal information checking section for, when having received the terminal information from said portable terminal, checking the terminal identification code contained in the received terminal information against the terminal identification code stored in said memory section and, only when the received terminal identification code matches with the stored terminal identification code as a result of the checking by said terminal information checking section, obtaining the corresponding one of the communication programs from said memory section based on the type and the class contained in the received terminal information and transmitting the obtained communication program to said portable terminal and, if the received terminal identification code does not match with the stored terminal identification code, avoiding transmitting the obtained communication program to said portable terminal.

24. The public wireless local area network connection servicing device according to claim 21,
wherein said ticket issuing device comprises a wireless integrated circuit interface section for performing bi-directional communication with said portable terminal, and a second utilization ticket issuing section for, when said user wishes to purchase said utilization ticket, requesting said authentication server to generate the authentication information, for receiving the generated authentication information, for storing the received authentication information in said memory section of said utilization ticket, and for issuing said utilization ticket;
wherein said portable terminal comprises a wireless integrated circuit interface section for performing bi-directional communication with said ticket issuing device, an authentication information receiving section for receiving the authentication information from said utilization ticket, and a second terminal information transmitting section for transmitting the authentication information and the terminal information received by said authentication information receiving section to said ticket issuing device; and
wherein said ticket issuing device further comprises a second communication program transmitting section for receiving the authentication information and the terminal information from said portable terminal and, based on the type and the class contained in the received terminal information, obtaining the corresponding one of the communication programs, adding the received authentication information to the obtained communication program, and transmitting it to said portable terminal.

25. The public wireless local area network connection servicing device according to claim 21,
wherein said portable terminal is further connected via the communication network to a providing server from which the communication program is provided;
wherein said providing server is provided with the communication program of the communication relation, in accordance with each type and each class of said portable terminal;
wherein said ticket issuing device is provided with address information that contains a network address required to connect said portable terminal to said providing server and a third utilization ticket issuing section for, when said user wishes to purchase said utilization ticket, requesting said authentication server to generate the authentication information, for receiving the generated authentication information, for storing the received authentication information and the address information in said memory section of said utilization ticket, and for issuing said utilization ticket; and wherein said portable terminal further comprises an authentication address information receiving section for receiving the authentication information and the address information from said utilization ticket, an authentication terminal information transmitting section for transmitting the authentication information and the terminal information to one of said providing servers that corresponds to the network address contained in the address information received by said authentication address information receiving section, and a third communication program receiving section for receiving from said providing server the communication program to which the authentication information is added, based on the type and the class contained in the terminal information transmitted by said authentication terminal information transmitting section.

26. The public wireless local area network connection servicing device according to claim 19, wherein said utilization ticket or said ticket issuing device is utilized in an area that can be connected to the public wireless local area net work or commercial facilities utilized by said user.

27. The public wireless local area network connection servicing device according to claim 21, wherein the communication network is a portable telephone network or a personal handy-phone system network.

* * * * *